(12) United States Patent (10) Patent No.: US 12,019,157 B2
Gotzig et al. (45) Date of Patent: Jun. 25, 2024

(54) METHOD FOR OPERATING A DISTANCE SENSOR OF A VEHICLE IN WHICH A TRANSMISSION SIGNAL IS ADAPTED IN ACCORDANCE WITH HOW AN OBJECT IS CLASSIFIED, COMPUTING DEVICE, AND SENSOR DEVICE

(71) Applicant: Valeo Schalter und Sensoren GmbH, Bietigheim-Bissingen (DE)

(72) Inventors: Heinrich Gotzig, Bietigheim-Bissingen (DE); Mohamed Elamir Mohamed, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 134 days.

(21) Appl. No.: 17/774,702

(22) PCT Filed: Oct. 21, 2020

(86) PCT No.: PCT/EP2020/079588
§ 371 (c)(1),
(2) Date: May 5, 2022

(87) PCT Pub. No.: WO2021/094065
PCT Pub. Date: May 20, 2021

(65) Prior Publication Data
US 2022/0390601 A1 Dec. 8, 2022

(30) Foreign Application Priority Data
Nov. 11, 2019 (DE) ..................... 10 2019 130 295.1

(51) Int. Cl.
*G01S 15/931* (2020.01)
(52) U.S. Cl.
CPC ................................ *G01S 15/931* (2013.01)

(58) Field of Classification Search
CPC ...... G01S 15/931; G01S 7/4013; G01S 7/417; G01S 7/539; G01S 15/10; G01S 15/34;
(Continued)

(56) References Cited

U.S. PATENT DOCUMENTS 6,279,396 B1 8/2001 Imagawa et al.
2004/0081020 A1 4/2004 Blosser et al.
(Continued)

FOREIGN PATENT DOCUMENTS

CA 3094275 A1 * 9/2019 ............. G06N 20/00
DE 102004019651 A1 11/2005
(Continued)

OTHER PUBLICATIONS

Translation of DE 102017110665. (Year: 2018).*
(Continued)

*Primary Examiner* — Daniel Pihulic
(74) *Attorney, Agent, or Firm* — Osha Bergman Watanabe & Burton LLP

(57) ABSTRACT

The invention relates to a method for operating a distance sensor (4) of a vehicle (1), in which method a plurality of successive measurement cycles are carried out in an operating mode, wherein, in each measurement cycle, a transmission signal is transmitted, a reception signal (Rx1 to Rx8) is determined on the basis of the transmission signal reflected in a surrounding region (9) of the vehicle (1), the object (8) is classified, and the transmission signal is selected from a plurality of predefined transmission signals in accordance with how the object (8) is classified, wherein the transmission signal is selected in accordance with an assignment rule determined in a learning mode, said assignment rule describing an assignment of the plurality of predefined transmission signals to classes of objects (8), wherein, in each measurement cycle, the object (8) is (Continued)

classified on the basis of the reception signal (Rx1 to Rx8) and the transmission signal is selected in accordance with how the object (8) is classified for subsequent measurement cycles.

14 Claims, 3 Drawing Sheets

(58) Field of Classification Search
CPC .. G01S 7/411; G01S 7/52004; G01S 7/52006; G01S 7/524; G01S 13/343; G01S 2007/52007; G01S 2013/932; G01S 2013/9322; G06N 20/00
See application file for complete search history.

(56) References Cited

U.S. PATENT DOCUMENTS

| | | | |
|---|---|---|---|
| 2018/0314921 A1 | 11/2018 | Mercep et al. | |
| 2018/0348343 A1 | 12/2018 | Achour et al. | |
| 2019/0212438 A1 | 7/2019 | Kim | |
| 2022/0390601 A1* | 12/2022 | Gotzig | G01S 15/10 |

FOREIGN PATENT DOCUMENTS

| | | | |
|---|---|---|---|
| DE | 102010033210 A1 | 2/2012 | |
| DE | 102014110187 A1 | 1/2016 | |
| DE | 102017110665 A1 | 11/2018 | |
| DE | 102019130295 A1 * | 5/2021 | G01S 15/10 |
| EP | 4058822 A1 * | 9/2022 | G01S 15/10 |
| KR | 2019-0093736 A | 8/2019 | |
| WO | WO-2021094065 A1 * | 5/2021 | G01S 15/10 |

OTHER PUBLICATIONS

International Search Report and Written Opinion issued in corresponding International Patent Application No. PCT/EP2020/079588, mailed on Jan. 18, 2021 (16 pages).

Search Report issued in corresponding German Patent Application No. 10 2019 130 295.1, dated Sep. 22, 2020 (6 pages).

Office Action Issued in Corresponding Korean Application No. 2022-7019607, dated Jan. 23, 2024. (20 Pages with English Translation).

* cited by examiner

METHOD FOR OPERATING A DISTANCE SENSOR OF A VEHICLE IN WHICH A TRANSMISSION SIGNAL IS ADAPTED IN ACCORDANCE WITH HOW AN OBJECT IS CLASSIFIED, COMPUTING DEVICE, AND SENSOR DEVICE

The present invention relates to a method for operating a distance sensor of a vehicle, in which a plurality of successive measurement cycles are carried out in an operating mode. In each measurement cycle a transmission signal is transmitted and the transmission signal reflected in an area surrounding the vehicle is taken as a basis for determining a received signal. Furthermore, the object is classified and the transmission signal is selected from a plurality of predetermined transmission signals on the basis of the classification of the object, the selection of the transmission signal being carried out on the basis of an association rule, determined in a learning mode, that describes an association of the plurality of predetermined transmission signals with classes of objects. In addition, the present invention relates to a computing device and a sensor apparatus. Finally, the present invention relates to a computer program and a computer-readable (storage) medium.

Various distance sensors for vehicles are known from the prior art. Such distance sensors are usually used to sense objects, or obstacles, in an area surrounding the vehicle. The distance sensors may be in the form of ultrasonic sensors, radar sensors, lidar sensors or laser scanners, for example. When the distance sensors are in operation, a transmission signal is usually transmitted and the transmission signal reflected from an object in the surrounding area is received again. The delay between transmission of the transmission signal and reception of the transmission signal reflected by the object may then be taken as a basis for determining the distance between the distance sensor and the object.

In addition, it is known from the prior art that the transmission signal transmitted using a distance sensor is varied. In this regard, DE 10 2017 110 665 A1 describes a method for operating a distance sensor of a motor vehicle, in which, in an operating mode of the distance sensor, a transmission signal is transmitted and the transmission signal reflected by the object in the area surrounding the motor vehicle is received as a received signal. There is provision here for the transmission signal to be selected from a plurality of predetermined transmission signals. An ambient condition that describes the surrounding area is also identified in the operating mode. Furthermore, the transmission signal is selected on the basis of an association rule, the association rule describing an association of the plurality of predetermined transmission signals with reference ambient conditions. This association rule is determined in a learning mode of the distance sensor. Furthermore, there may be provision for the ambient conditions to describe the object, weather conditions and/or an interference signal in the surrounding area.

It is the object of the present invention to demonstrate a solution as to how the operation of a distance sensor that involves the transmission signals being varied may be carried out more reliably.

This object is achieved according to the invention by a method, by a computing device, by a sensor apparatus, by a computer program and by a computer-readable (storage) medium having the features according to the independent claims. Advantageous developments of the present invention are the subject matter of the dependent claims.

A method according to the invention is used to operate a distance sensor of a vehicle. This involves a plurality of successive measurement cycles being carried out in an operating mode. In each measurement cycle a transmission signal is transmitted and the transmission signal reflected in an area surrounding the vehicle is taken as a basis for determining a received signal. In addition, the object is classified. Furthermore, the transmission signal is selected from a plurality of predetermined transmission signals on the basis of the classification of the object, the selection of the transmission signal being carried out on the basis of an association rule, determined in a learning mode, that describes an association of the plurality of predetermined transmission signals with classes of objects. In addition, there is provision that in each measurement cycle the object is classified on the basis of the received signal and the transmission signal is selected for a subsequent measurement cycle on the basis of the classification of the object.

The method is intended to be used to operate a distance sensor for a vehicle. This distance sensor, which may also be referred to as an environment sensor, is used to monitor the area surrounding the vehicle. In particular, the measurements of the distance sensor are intended to be taken as a basis for identifying objects, or obstacles, in this surrounding area. The distance sensor may be, for example, a radar sensor, a lidar sensor, a laser scanner, an optical sensor or the like. The distance sensor is preferably an ultrasonic sensor. The distance sensor may be used to transmit the transmission signal and to receive again the transmission signal reflected in the surrounding area, or by the object. This transmission signal may be transmitted as a pulse. This means that the distance sensor or a transmission device of the distance sensor is activated for transmitting the transmission signal for a predetermined period of time. This transmission signal may also be referred to as a Tx signal. The reflected, or received, transmission signal may be taken as a basis for determining the received signal. In other words, the received signal may describe the transmission signal reflected by the object. In particular, the transmission signal, which may also be referred to as an Rx signal, may describe a time characteristic of the reflected transmission signal, or of the echo of the transmission signal. The delay between transmission of the transmission signal and reception of the transmission signal reflected by the object may then be taken as a basis for determining the distance between the distance sensor and the object.

There is provision for the transmission signal transmitted using the distance sensor to be varied. There is thus provision for the transmission signal to be selected from the plurality of predetermined transmission signals. The transmission signal is selected on the basis of the at least one object in the surrounding area. For this purpose, the object or at least one object in the surrounding area is first classified. This classification may be performed on the basis of the received signal, for example. For this purpose, it is possible to examine whether the received signal has typical features that indicate an object class. The classification is then taken as a basis for selecting the transmission signal from the plurality of predetermined transmission signals. The selection is made according to the association rule that was previously determined in the learning mode. In particular, the association rule is determined in such a way that the respective class of objects with the related transmission signal may be identified as well as possible. This learning mode is performed in particular before the operating mode of the distance sensor. For example, the learning mode may be performed before the distance sensor is put into operation, or installed. The association rule describes in particular the association of the plurality of predetermined transmission signals with the object classes. In other words, the association rule preferably describes which transmission signal is intended to be selected for which object class.

According to an essential aspect of the present invention, there is provision that in each measurement cycle the object is classified on the basis of the received signal and the transmission signal is selected for the subsequent measurement cycle on the basis of the classification of the object. The distance sensor is used to carry out temporally successive measurement cycles. In each measurement cycle the transmission signal may be transmitted and the transmission signal reflected in the surrounding area may be received again. There is now provision for a classification, or characterization, of the object to be carried out in each measurement cycle also. In the subsequent measurement cycle the transmission signal is then optionally adapted to match the classification. If the classification of the object remains unchanged in multiple measurement cycles, in particular the selection of the transmission signal is not changed either. Determination of the transmission signal for the next measurement cycle allows changing ambient conditions to be reacted to within a short period of time. In addition, objects that enter the surrounding area, or the sensing area of the distance sensor, may be reliably detected.

This is because the respective measurement cycles usually last only a few milliseconds. Overall, therefore, detection of the objects in the surrounding area may be carried out more reliably.

By way of example, vehicles, in particular passenger cars, trucks, motorcycles or the like, may be predefined as classes of objects. Pedestrians, cyclists or living beings may also be predefined as classes. In addition, posts, walls, ramps and curbs may be predefined as classes.

In the learning mode, reference measurements are preferably carried out on reference objects, the plurality of predetermined transmission signals being transmitted in the reference measurements using the distance sensor and the respective received signals being determined for the reference objects. Different reference objects may be used in the learning mode, or the training. These reference objects may differ from one another in terms of size, shape, surface and/or reflection properties. The reference objects may also be associated with an object class. At least one reference object may be used for different object classes. In the learning mode, the respective transmission signals may now be transmitted for each of the reference objects and the transmission signal reflected by the reference object may be received again. The respective received signals that are derived therefrom may be subjected to a learning algorithm. As a result, there are different results, or received signals, for the same class of object, and these may now in turn be integrated into the trained system by way of a subsequent learning method. One result of the learning method, or of the training, is knowledge as to which form of transmission signal is particularly suitable for classifying different objects. This knowledge may then be used in the operating mode of the distance sensor, and therefore the object identification may be improved.

In one embodiment, for the association rule is determined on the basis of the respective received signals by means of a machine learning method. In particular, so-called deep learning may be used. There may also be provision for an artificial neural network and/or a generic algorithm to be used in the learning mode. Because the reference measurements for the individual reference objects are carried out using the respective transmission signals, different information is available to the learning algorithm for each individual reference object, as a result of which redundancy can be increased. Furthermore, different object shapes or classes of objects react differently to the different forms of the transmission signals. This allows better results to be achieved in the training because the variance of the transmission signals takes account of the diversity of the objects, or object classes, to be detected. In this way, more significant input data may be delivered to the deep learning algorithm used in practice.

There may also be provision for the reference measurements to be carried out for different ambient conditions. By way of example, different weather conditions may be simulated in the learning mode. In addition, interference signals, or noise components, may be taken into account in the reference measurements. There may also be provision for the reference measurements to be carried out for different distances between the distance sensor and the respective reference objects. It is therefore possible for the transmission signal to be optimized both in relation to the object and on the basis of the ambient conditions.

In a further embodiment, a reference transmission signal is transmitted as the transmission signal at the start of the operating mode. At the start of the operating mode, or in the first measurement cycle, classification has not yet been carried out for the at least one object in the surrounding area. In this case, the reference transmission signal may be transmitted first. This reference transmission signal may be chosen in such a way that it may be used to identify different classes of objects, or object types. The received signal, which is determined on the basis of the reference transmission signal reflected by the object, may then be taken as a basis for carrying out the classification of the object and making the selection of the transmission signal for the subsequent measurement cycle.

In a further configuration, a reference transmission signal, or the reference transmission signal, is selected in the subsequent measurement cycle if the object is not identified in a measurement cycle. If the classification of the object cannot be carried out, or cannot be carried out unambiguously, in a measurement cycle, the reference transmission signal may be selected in the subsequent measurement cycle. The information that the at least one object in the surrounding area could not be classified or could not be unambiguously classified may accordingly also be stored in this instance.

Furthermore, it is advantageous if an amplitude-modulated transmission signal is selected as the reference transmission signal. Experiments here have shown that an amplitude-modulated transmission signal is suitable for identifying different types of objects, or object classes. This applies in particular to the case in which the distance sensor is in the form of an ultrasonic sensor. In this instance, the transmitted ultrasonic signal may be modulated as a transmission signal with a low-frequency signal.

In a further embodiment, an amplitude-modulated transmission signal is selected as the transmission signal in the subsequent measurement cycle if the object is classified as a tall object. If the object is identified as being a tall object in the current measurement cycle, the amplitude-dominated transmission signal may be selected in the subsequent measurement cycle. The tall object may be identified on the basis of the received signal, for example on the basis of the number of echoes and/or the amplitude of the received signal. The object may be, by way of example, a post, a wall or the like. Experiments here have shown that tall objects such as these may be reliably identified if the amplitude-modeled transmission signal is transmitted as the transmission signal.

In a further configuration, a frequency-modulated transmission signal is selected as the transmission signal in the subsequent measurement cycle if the object is classified as a living being. Such a living being may be a pedestrian or an animal, for example. Here too, experiments have shown that such living beings may be reliably identified if a frequency-modulated transmission signal is selected. In particular, a chirp signal may be selected as the frequency-modulated transmission signal. A so-called chirp-up signal may particularly preferably be used here.

In a further embodiment, the transmission signal is selected on the basis of the object that is at the shortest distance from the distance sensor if at least two objects are identified in the surrounding area. If multiple objects are identified in the surrounding area on the basis of the received signal, the selection of the transmission signal may be carried out on the basis of the object that is at the shortest distance from the distance sensor, or the vehicle. This object at the shortest distance has the highest relevance for the monitoring of the surrounding area. It is then advantageous if this object is reliably identified.

There may also be provision for prioritization to be carried out if there are multiple objects in the surrounding area. By way of example, specific object classes or one object class may be prioritized. If a prioritized object class is identified, the transmission signal for this object class may be selected. By way of example, the pedestrian object class may be prioritized. The effect that may be achieved thereby is that pedestrians are reliably identified and therefore safety is increased.

It is also advantageous if the plurality of transmission signals differ from one another in terms of modulation, frequency and/or transmission duration. In the operating mode, the distance sensor has a variability with regard to the transmission signals. These transmission signals may differ from each other on the basis of frequency, phase, period of time or the like. Depending on the physical sensor in principle, special forms of the amplitude characteristic of the transmission signal as a function of time may be chosen. If the distance sensor is in the form of an ultrasonic sensor, the transmission signals may differ from one another in terms of excitation frequency, a frequency change or the like.

A computing device according to the invention for a sensor apparatus of a vehicle is designed to carry out a method according to the invention and the advantageous configurations thereof. The computing device may be provided for example by an electronic control unit of the vehicle. In addition, the computing device may be provided by electronics of the distance sensor, or sensor electronics. In this case, the computing device may be in particular in the form of an application-specific integrated circuit (ASIC).

A sensor apparatus according to the invention for a vehicle comprises a computing device according to the invention and at least one distance sensor. The distance sensor may be in particular in the form of an ultrasonic sensor. The sensor apparatus may preferably have a plurality of distance sensors, which may be placed in a distributed arrangement on the vehicle, for example. A further aspect of the invention relates to a driver assistance system that comprises a sensor apparatus according to the invention. The driver assistance system may be used to maneuver the vehicle at least semi-autonomously on the basis of the detected object.

A vehicle according to the invention comprises an ultrasonic sensor apparatus according to the invention. The vehicle may be in the form of a passenger car, for example. There may also be provision for the vehicle to be in the form of a utility vehicle.

A further aspect of the invention relates to a computer program, comprising instructions that, when the program is executed by a computing device, cause the latter to carry out a method according to the invention and the advantageous configurations thereof.

A computer-readable (storage) medium according to the invention comprises instructions that, when executed by a computing device, cause the latter to carry out a method according to the invention and the advantageous configurations thereof.

The preferred embodiments presented with reference to the method according to the invention and the advantages of said embodiments apply mutatis mutandis to the computing device according to the invention, to the sensor apparatus according to the invention, to the vehicle according to the invention, to the computer program according to the invention and to the computer-readable (storage) medium according to the invention.

Further features of the invention arise from the claims, the figures and the description of the figures. The features and combinations of features mentioned in the description above and the features and combinations of features mentioned in the description of the figures below and/or shown in the figures alone may be used not only in the particular combination indicated but also in other combinations without departing from the scope of the invention. The invention is therefore also intended to be considered to include and disclose embodiments that are not explicitly shown and explained in the figures but that emerge from the elucidated embodiments, and can be generated, by way of separate combinations of features. Embodiments and combinations of features that therefore do not have all the features of an originally formulated independent claim should also be regarded as disclosed. Furthermore, embodiments and combinations of features, in particular by way of the embodiments outlined above, that go beyond or deviate from the combinations of features outlined in the back references of the claims should be regarded as disclosed.

The invention will now be explained in more detail using preferred exemplary embodiments and with reference to the accompanying drawings, in which.

Elements that are the same or have the same function are provided with the same reference signs in the figures.

Figure 1:
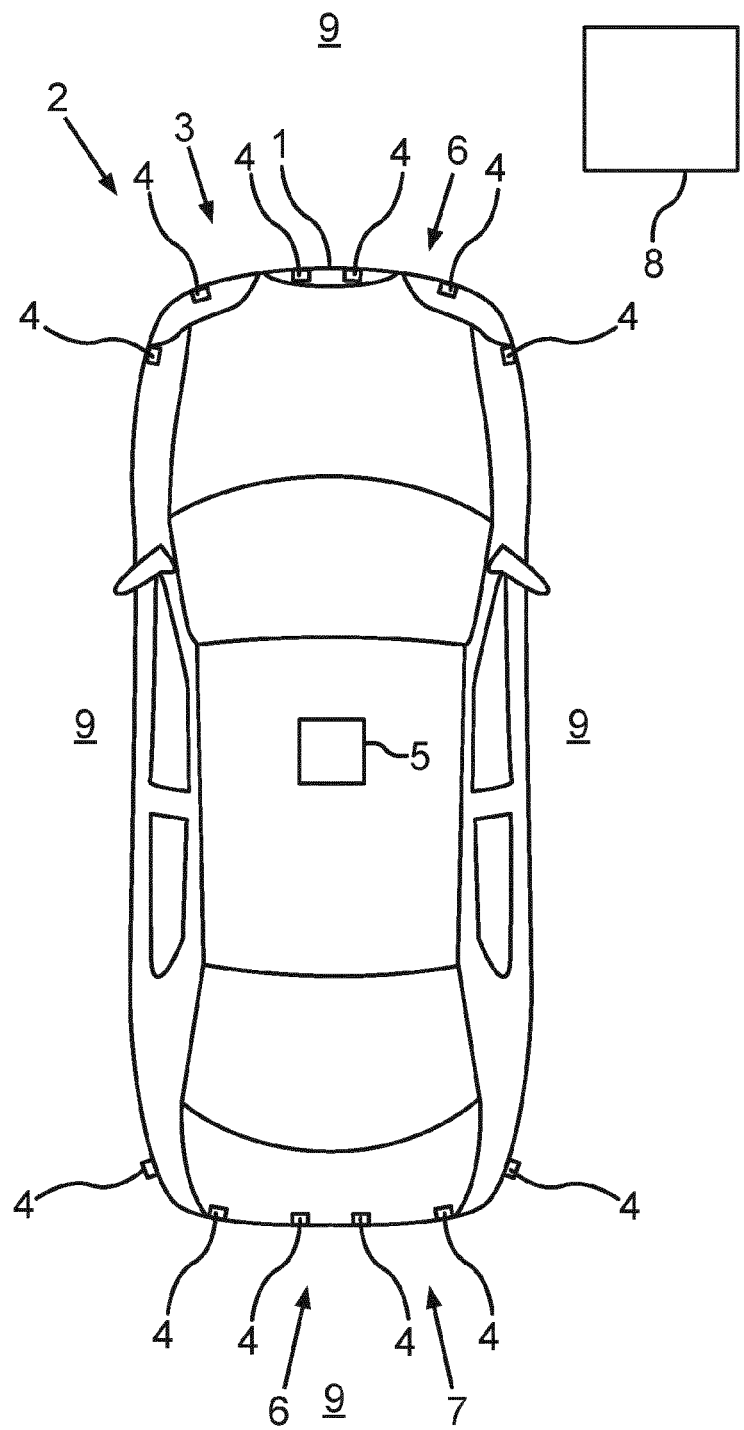
FIG. 1 shows a schematic representation of a vehicle that has a sensor apparatus with a plurality of distance sensors.

FIG. 1 shows a vehicle 1, which is in the form of a passenger car in the present case, in a plan view. The vehicle 1 comprises a driver assistance system 2 that is used to assist a driver in driving the vehicle 1. The driver assistance system 2 may be in the form of a parking assistance system, for example, by means of which a driver may be assisted in parking the vehicle 1 in a parking space and/or in unparking from the parking space.

The driver assistance system 2, or the vehicle 1, also has a sensor apparatus 3. This sensor apparatus 3 comprises at least one distance sensor 4. In the present exemplary embodiment, the sensor apparatus 3 comprises twelve distance sensors 4, six of which are arranged in a front area 6 of the vehicle 1 and six in a rear area 7 of the vehicle 1. In the present example, the distance sensors 4 are in the form of ultrasonic sensors. In the present case, the distance sensors 4 are mounted on the bumpers of the vehicle 1. The ultrasonic sensors may be arranged in corresponding recesses, or through-openings, in the bumpers, at least in certain areas. There may also be provision for the ultrasonic sensors to be in a concealed arrangement behind the bumpers. In principle, the ultrasonic sensors may also be arranged on other paneling portions or components of the vehicle 1.

The respective distance sensors 4 may be used to detect objects 8 in surroundings of, or in an area 9 surrounding, the vehicle 1. An object 8 in the surrounding area 9 is shown schematically in the present case. The sensor apparatus 3 also comprises a computing device 5 in the form of an electronic control unit. This computing device 5 is connected to the respective distance sensors 4 for data transmission purposes. A data line, or a corresponding data bus, is not shown in the present case for the sake of clarity. The computing device 5 may be used to excite the respective distance sensors 4 to transmit a transmission signal. In addition, received signals or other data provided using the ultrasonic sensors 4 may be transmitted to the computing device 5. These data may then be taken as a basis for using the computing device 5 to identify the objects 8 in the surrounding area 9. This information may then be used by the driver assistance system 2 to output an output to the driver of the vehicle 1. There may also be provision for the driver assistance system 2 to intervene in a steering system, a braking system and/or a drive motor of the vehicle in order to maneuver the vehicle 1 at least semi-autonomously on the basis of the detected object 8.

During operation of the sensor apparatus 3, or in an operating mode, the respective distance sensors 4 are used to carry out temporally successive measurement cycles. In each measurement cycle a transmission signal is transmitted and the transmission signal reflected in the surrounding area 9 is taken as a basis for determining a received signal. In this case, there is provision for the transmission signal to be selected from a plurality of predetermined transmission signals in the respective measurement cycles. The transmission signal is selected from the plurality of predetermined transmission signals on the basis of the classification of the object 8. For this purpose, a reference transmission signal may be transmitted in a first measurement cycle. This reference transmission signal may be an amplitude-modulated transmission signal, for example. The received signal determined on the basis of the transmission signal reflected in the surrounding area 9 may then be taken as a basis for determining whether an object 8 is located in the surrounding area 9 and in what configuration this object 8 is. If an object 8 is located in the surrounding area 9, it may be classified on the basis of the received signal. The object class determined may then be taken as a basis for selecting a related transmission signal that is then transmitted in the subsequent measurement cycle.

The transmission signal for the subsequent measurement cycle is selected on the basis of an association rule. This association rule associates applicable transmission signals with different object classes. This association rule is determined in a learning mode, or in a training, of the sensor apparatus 3, or of the distance sensor 4. This may involve reference measurements being carried out on different reference objects. For this purpose, the respective transmission signals or different transmission signals may be transmitted for one of the reference objects and the transmission signals reflected by the reference object may be received again. The received signals Rx1 to Rx8 derived therefrom may then be supplied to a learning algorithm and the system may therefore be trained.

Figure 2:
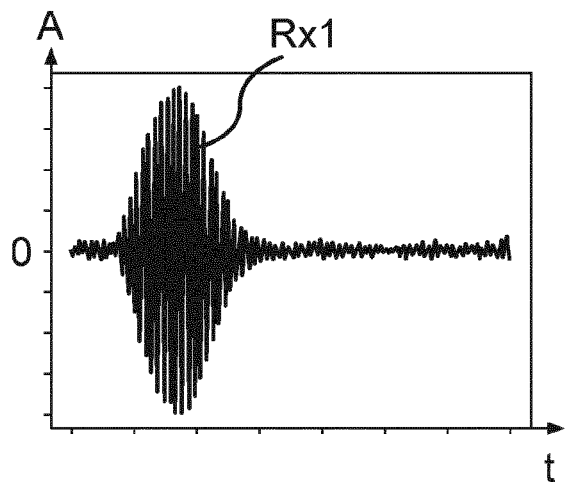
FIG. 2 shows a first received signal that describes the reflection of a first transmission signal from a first reference object.
Figure 3:
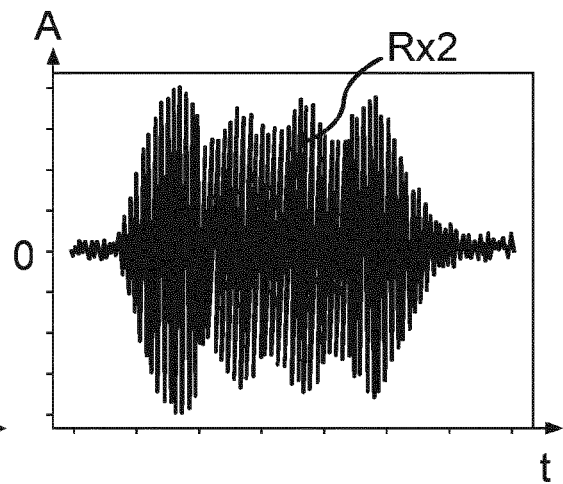
FIG. 3 shows a second received signal that describes the reflection of a first transmission signal from a second reference object.

FIGS. 2 to 9 show, by way of illustration, different received signals Rx1 to Rx8 determined in the learning mode. In each case, the time t, or the distance, is plotted on the abscissa and an amplitude A is plotted on the ordinate. FIG. 2 shows a first received signal Rx1 that describes the echo of a first transmission signal from a first reference object. By comparison, FIG. 3 shows a second received signal Rx2 that describes the first transmission signal reflected by a second reference object. It can be seen here that the two reference signals Rx1 and Rx2 are clearly distinguishable from one another. Furthermore, the two received signals Rx1 and Rx2 are clearly visible.

Figure 4:
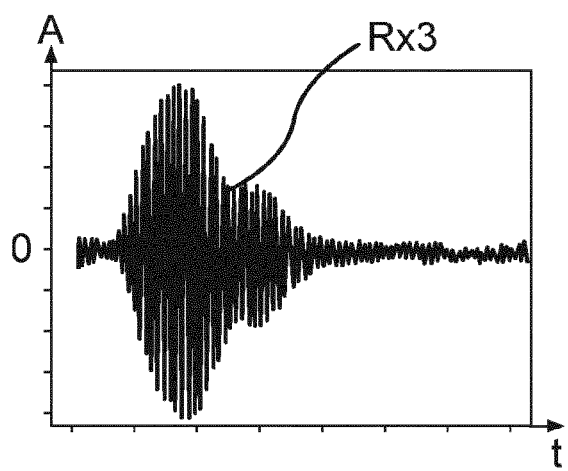
FIG. 4 shows a third received signal that describes the reflection of a first transmission signal from a third reference object.
Figure 5:
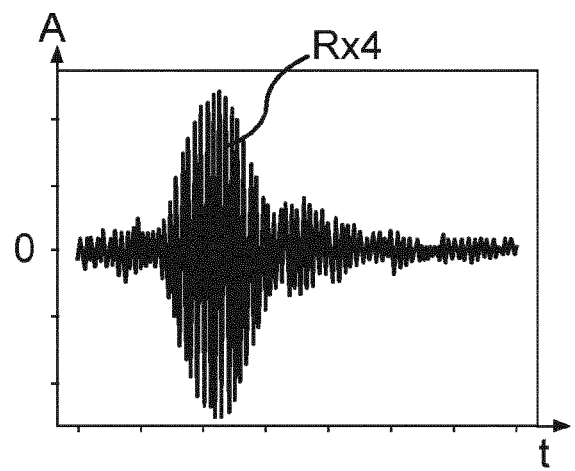
FIG. 5 shows a fourth received signal that describes the reflection of a first transmission signal from a fourth reference object.

FIG. 4 shows a third received signal Rx3 that describes the reflection of the first transmission signal from a third reference object. FIG. 5 shows a fourth received signal Rx4 that describes the reflection of the first transmission signal from a fourth reference object. In this case it can be seen that the amplitude characteristic of the third received signal Rx3 and of the fourth received signal Rx4 are very similar to one another. It is thus difficult to distinguish between these received signals Rx3, Rx4 for the classification of the objects 8.

Figure 6:
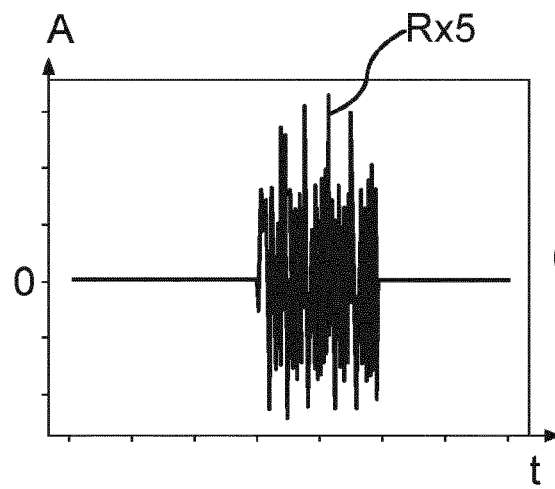
FIG. 6 shows a fifth received signal that describes the reflection of a second transmission signal from the third reference object.
Figure 7:
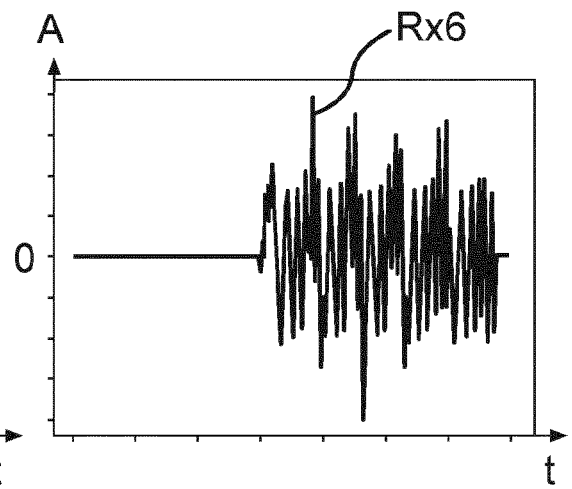
FIG. 7 shows a sixth received signal that describes the reflection of a second transmission signal from the fourth reference object.

By comparison, FIG. 6 shows a fifth received signal Rx5 that describes a second transmission signal reflected by the third reference object. FIG. 7 shows a time characteristic of a sixth received signal Rx6 that describes the second transmission signal reflected by the fourth reference object. It can be seen here that the fifth received signal Rx5 and the sixth received signal Rx6 differ significantly from one another. This increases the probability of the objects 8, or reference objects, being able to be distinguished from one another. In addition, additional information that describes the properties of the object 8 may be taken from the received signals Rx5 and Rx6.

Figure 8:
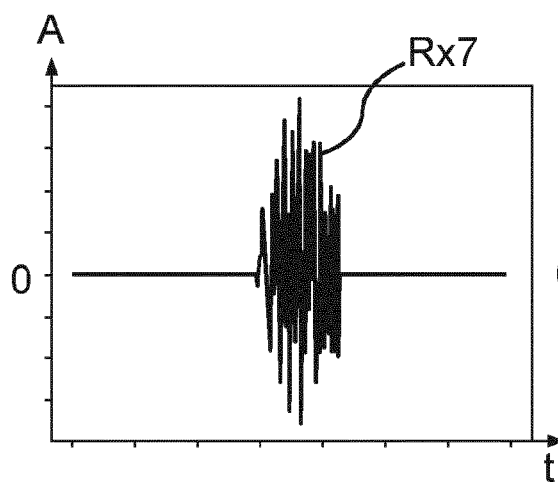
FIG. 8 shows a seventh received signal that describes the reflection of a second transmission signal from the first reference object.
Figure 9:
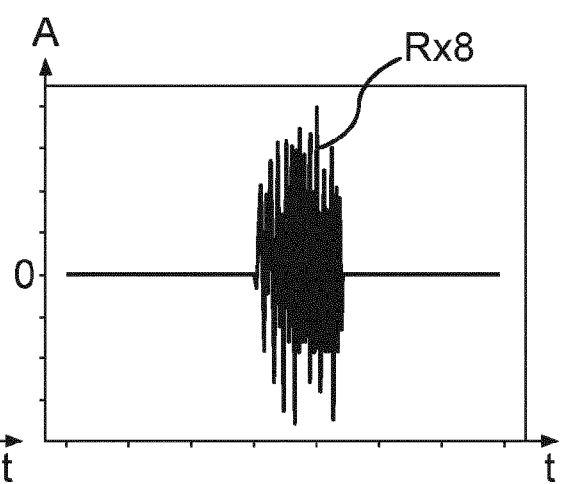
FIG. 9 shows an eighth received signal that describes the reflection of a second transmission signal from the second reference object.

FIG. 8 shows a seventh received signal Rx7 that describes the second transmission signal reflected by the first reference object. Furthermore, FIG. 9 shows an eighth received signal Rx8 that describes the second transmission signal reflected by the second reference object. On the basis of the seventh received signal Rx7 and the eighth received signal Rx8, it can be seen that the first reference object and the second reference object here are difficult to distinguish from one another when the second transmission signal is transmitted. Overall, it was therefore possible to show that different types of transmission signals are suitable for the classification, or characterization, of the objects 8 in different ways.

These results from the learning mode, or the training, may now be supplied to a machine learning method, in particular a deep learning algorithm. One result of the training is knowledge as to which form of the transmission signal is particularly suitable for classifying a type of object 8, or an object class. This knowledge may then be used in the operating mode of the sensor apparatus 3 in order to select the appropriate transmission signal for the object class.

The invention claimed is:

1. A method for operating a distance sensor of a vehicle, comprising:
    carrying out a plurality of successive measurement cycles in an operating mode, wherein in each measurement cycle a transmission signal is transmitted, the transmission signal reflected in an area surrounding the vehicle is taken as a basis for determining a received signal; and
    classifying at least one object and selecting the transmission signal from a plurality of predetermined transmission signals on the basis of the classification of the at least one object,
    the selection of the transmission signal being carried out on the basis of an association rule, determined in a learning mode, that describes an association of the plurality of predetermined transmission signals with classes of objects,
    wherein in each measurement cycle the at least one object is classified on the basis of the received signal and the transmission signal is selected for a subsequent measurement cycle on the basis of the classification of the at least one object,
    determining whether each of a plurality of objects is classified during the classification of the at least one object,
    wherein the plurality of objects comprises the at least one object, and
    wherein selecting the transmission signal is based, at least in part, on a prioritization of object classes, in response to the determination that each of the plurality of objects is classified.

2. The method as claimed in claim 1, wherein in the learning mode, reference measurements are carried out on reference objects, the plurality of predetermined transmission signals being transmitted in the reference measurements using the distance sensor and the respective received signals being determined for the reference objects.

3. The method as claimed in claim 2, wherein for the association rule is determined on the basis of the respective received signals by a machine learning method.

4. The method as claimed in claim 1, wherein a reference transmission signal is transmitted as the transmission signal at the start of the operating mode.

5. The method as claimed in claim 1, wherein if the object is not identified in a measurement cycle, a reference transmission signal is selected in the subsequent measurement cycle.

6. The method as claimed in claim 1, wherein an amplitude-modulated transmission signal is selected as the reference transmission signal.

7. The method as claimed in claim 1, wherein if the object is classified as a tall object, an amplitude-modulated transmission signal is selected as the transmission signal in the subsequent measurement cycle.

8. The method as claimed in claim 1, wherein if the object is classified as a living being, a frequency-modulated transmission signal is selected as the transmission signal in the subsequent measurement cycle.

9. The method as claimed in claim 1, wherein if at least two objects are identified in the surrounding area, the transmission signal is selected on the basis of the object that is at the shortest distance from the distance sensor.

10. The method as claimed in claim 1, wherein the plurality of transmission signals differ from one another in terms of a modulation, a frequency and/or a transmission duration.

11. A computing device for a sensor apparatus of a vehicle, wherein the computing device is configured to carry out a method as claimed in claim 1.

12. A sensor apparatus for a vehicle comprising: a computing device as claimed in claim 11; and at least one distance sensor in the form of an ultrasonic sensor.

13. A computer program, comprising instructions that, when the program is executed by a computing device, cause the latter to carry out a method as claimed in claim 1.

14. A non-transitory computer-readable storage medium, comprising instructions that, when executed by a computing device, cause the latter to carry out a method as claimed in claim 1.

* * * * *